US012560578B2

(12) United States Patent
Crnkovich et al.

(10) Patent No.: US 12,560,578 B2
(45) Date of Patent: Feb. 24, 2026

(54) ULTRASONIC DETECTION OF BACTERIA IN WATER OF A MEDICAL SYSTEM

(71) Applicants: Fresenius Medical Care Holdings, Inc., Waltham, MA (US); Fresenius Medical Care Deutschland GmbH, Bad Homburg (DE)

(72) Inventors: Martin Crnkovich, Concord, MA (US); Christian Schlaeper, Bad Homburg (DE); David Yuds, Waltham, MA (US)

(73) Assignees: FRESENIUS MEDICAL CARE HOLDINGS, INC., Waltham, MA (US); FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 288 days.

(21) Appl. No.: 18/370,211

(22) Filed: Sep. 19, 2023

(65) Prior Publication Data

US 2025/0093301 A1     Mar. 20, 2025

(51) Int. Cl.
*G01N 29/032* (2006.01)

(52) U.S. Cl.
CPC ..... *G01N 29/032* (2013.01); *G01N 2291/015* (2013.01); *G01N 2291/022* (2013.01)

(58) Field of Classification Search
CPC .......... G01N 29/032; G01N 2291/015; G01N 2291/022; G01N 2291/02466;
(Continued)

(56) References Cited

U.S. PATENT DOCUMENTS 5,015,995 A * 5/1991 Holroyd .............. G01F 23/2965
367/908
7,228,740 B2 6/2007 Sinha
(Continued)

FOREIGN PATENT DOCUMENTS

ES        2147149 A1      8/2000
KR     20170142329 A    12/2017
(Continued)

OTHER PUBLICATIONS

Gil-Santos et al., "Optomechanical detection of vibration modes of a single bacterium," *Nature Nanotech.*, 15(6), 469-474 (2020).
(Continued)

*Primary Examiner* — Tarun Sinha
(74) *Attorney, Agent, or Firm* — LEYDIG, VOIT & MAYER, LTD

(57)     ABSTRACT

A medical system for detecting bacteria in water includes: a water distribution or processing system; an inlet for receiving water into the water distribution or processing system; an outlet for expelling water from the water distribution or processing system; and at least one ultrasonic testing system. The at least one ultrasonic testing system: an ultrasonic emitter configured to emit ultrasonic waves into a testing volume containing water, and an ultrasonic sensor configured to detect a sonic response of bacteria in the testing volume based on ultrasonic waves emitted by the ultrasonic emitter. The at least one ultrasonic testing system is arranged at the inlet or the outlet.

20 Claims, 8 Drawing Sheets

(58) Field of Classification Search
CPC .. G01N 29/036; G01N 29/222; G01N 29/348;
G01N 29/4427; C02F 1/36; C02F
2209/36; C02F 1/008; C02F 2103/026;
C02F 1/441; A61M 2202/203; A61M
2205/3375; A61M 1/1657
See application file for complete search history.

(56) References Cited

U.S. PATENT DOCUMENTS

| | | | | |
|---|---|---|---|---|
| 9,038,455 | B2 * | 5/2015 | Tincher | D06F 39/02 |
| | | | | 73/304 C |
| 11,573,205 | B2 | 2/2023 | Sinha et al. | |
| 2011/0123392 | A1 | 5/2011 | Dionne et al. | |
| 2021/0254972 | A1 * | 8/2021 | da Silva | G01N 29/11 |
| 2022/0001090 | A1 | 1/2022 | Schaefer et al. | |

FOREIGN PATENT DOCUMENTS

| | | |
|---|---|---|
| WO | WO 2020/003489 A1 | 1/2020 |
| WO | WO 2020/210439 A1 | 10/2020 |

OTHER PUBLICATIONS

Zinin et al., "Mechanical resonances of bacteria cells," *Phys Rev E*, 72 ((2005).

Zinin et al., "Deformation of biological cells in the acoustic field of an oscillating bubble," *Phys Rev E Stat Nonlin Soft Matter Phys*, 79(2 Pt 1) (Feb. 2009).

International Search Report and Written Opinion received for co-pending International Application No. PCT/US2024/045040, dated Nov. 21, 2024.

* cited by examiner

ULTRASONIC DETECTION OF BACTERIA IN WATER OF A MEDICAL SYSTEM

BACKGROUND

Bacteria rely on water for growth and reproduction. Accordingly, water (and many liquids containing water) can easily become contaminated and lead to the proliferation of bacteria to levels that are undesirable and/or dangerous to humans. In systems and processes that use water to create products that interact with or are consumed by humans, it is thus advantageous to ensure that bacterial contamination of water does not occur (or at least does not occur to an unsafe degree). This is particularly true in situations where the water is later ingested by a human or with respect to medical products where a water-based product may be directly or indirectly injected into a patient. For example, purified water to produce dialysis solution is used for a patient's hemodialysis treatment. Patients undergoing hemodialysis may be exposed to 120-200 liters of dialysis solution during each dialysis treatment, making them particularly vulnerable to small molecular contaminants in the water used to prepare concentrates and dialysis fluid. Such contaminants could enter the patient's bloodstream unimpeded and accumulate in the body in the absence of proper kidney excretion. As a result, dialysis facilities are required to use a properly designed and well-maintained water treatment system to safeguard patients from such risks.

In order to ensure that unsafe bacterial contamination does not occur in a water or water-based liquid network, frequent testing of water is carried out. This can be expensive and time-consuming, as current testing methods involve manual placement of a sample in a petri dish with an agar plate to stimulate growth, and then counting colonies to determine the number of colony forming units (CFUs) as a measurement for bacterial presence. If a system or process must be stopped during testing, this can lead to costly delays. Even if the system or process does not need to be stopped during testing, the slow process of growing the bacteria in a petri dish can lead to uncertainty regarding contamination pending the results. In smaller systems or facilities, testing may even require burdensome third party involvement. Furthermore, frequently employed contamination prevention methods do not function properly forever and may not even kill 100% of bacteria during optimal performance.

For example, dialysis clinics use purified water to generate dialysate for hemodialysis treatments. The purified water is often generated using a reverse osmosis (RO) system. In an RO system, pressure drives water across a semipermeable membrane to remove more than 90% of contaminants. This process removes ionic contaminants, bacteria, and endotoxins but additional filtering may still be required both in endotoxin filters in the water distribution piping to the dialysis machines and the dialysis machine filters (e.g. Fresenius Medical Care's 2008T dialysis machine with Diasafe Plus filter). Ring piping for the RO water of the system may become contaminated and thus needs to be routinely tested and disinfected. Specifically, monitoring of the water and dialysate for microbiologic contaminants is performed on a regular basis. RO water that has entered a dialysis machine does not return to the RO water ring piping, and dialysis machine filters accordingly do not help with contamination prevention in the RO ring piping. Some RO systems and ring pipings are known which have additional ultrapure filters. Some dialysis clinics do not have dedicated biomedical technicians, so the responsibility of monitoring and maintaining systems falls on clinic staff. Checking the RO system and the ring piping is outside of patient care, placing more burden on clinicians who must also closely monitor dialysis patients for signs of a hemolytic, pyrogenic, or other reaction, that may be symptoms of RO water contamination.

SUMMARY

In an exemplary embodiment, the present disclosure provides a medical system for detecting bacteria in water. The medical system includes: a water distribution or processing system; an inlet for receiving water into the water distribution or processing system; an outlet for expelling water from the water distribution or processing system; and at least one ultrasonic testing system. The at least one ultrasonic testing system: an ultrasonic emitter configured to emit ultrasonic waves into a testing volume containing water, and an ultrasonic sensor configured to detect a sonic response of bacteria in the testing volume based on ultrasonic waves emitted by the ultrasonic emitter. The at least one ultrasonic testing system is arranged at the inlet or the outlet.

In a further exemplary embodiment, the water distribution or processing system includes a reverse osmosis system.

In a further exemplary embodiment, the medical system includes a dialysis machine, and the water distribution or processing system is coupled to the dialysis machine.

In a further exemplary embodiment, the at least one ultrasonic testing system is configured for in-line testing of water, the ultrasonic emitter and the ultrasonic sensor being arranged on or adjacent a pipe, and the testing volume is within the pipe.

In a further exemplary embodiment, the at least one ultrasonic testing system includes a testing chamber, the testing chamber being separated from the inlet or the outlet by a diverter valve. The testing volume is within the testing chamber, and the ultrasonic emitter and the ultrasonic sensor are arranged adjacent to the testing chamber.

In a further exemplary embodiment, the medical system includes two ultrasonic testing systems.

In a further exemplary embodiment, a first ultrasonic testing system of the two ultrasonic testing systems is arranged at the inlet, and a second ultrasonic testing system of the two ultrasonic testing systems is arranged at the outlet.

In a further exemplary embodiment, the medical system includes a processor configured to receive signals from the ultrasonic sensors of the first and second ultrasonic testing systems, the processor being further configured to correlate the signals received from the ultrasonic sensors to a colony forming unit (CFU) measurement.

In a further exemplary embodiment, the processor is configured to determine whether each CFU measurement exceeds one or more predetermined threshold values, and wherein the processor is configured to initiate a responsive operation based on whether any CFU measurement exceeds the one or more predetermined threshold values.

In a further exemplary embodiment, a first of the two ultrasonic testing systems is configured for in-line testing and a second of the two ultrasonic testing systems includes a testing chamber separated from the inlet or the outlet by a diverter valve.

In another exemplary embodiment, the present disclosure provides an apparatus for detecting bacteria in water. The apparatus includes: an ultrasonic emitter configured to emit ultrasonic waves into a testing volume containing water; an ultrasonic sensor configured to detect a sonic response of bacteria in the testing volume based on ultrasonic waves emitted by the ultrasonic emitter; and a processor configured to determine an amount of bacteria in the water based on the detected sonic response.

In a further exemplary embodiment, the ultrasonic emitter and the ultrasonic sensor are arranged adjacent to a pipe or tube, and the testing volume is within the pipe or tube.

In a further exemplary embodiment, the ultrasonic emitter and the ultrasonic sensor are arranged adjacent to a testing chamber, and the testing volume is within the testing chamber.

In a further exemplary embodiment, the ultrasonic emitter and the ultrasonic sensor are arranged in a hemodialysis machine or a reverse osmosis system.

In yet another exemplary embodiment, the present disclosure provides a method for monitoring a bacterial presence in a water network. The method includes: emitting, by an ultrasonic emitter, ultrasonic waves into a first testing volume containing water; detecting, by an ultrasonic sensor, a sonic response of bacteria in the first testing volume to the emitted ultrasonic waves; and determining, by a processor, an amount of bacteria in the water based on the detected sonic response.

In a further exemplary embodiment, determining the amount of bacteria in the water comprises: correlating the sonic response with a colony forming unit (CFU) measurement.

In a further exemplary embodiment, the method further includes: emitting ultrasonic waves into a second testing volume containing water; and detecting a sonic response of bacteria in the second testing volume to the emitted ultrasonic waves.

In a further exemplary embodiment, the method further includes: comparing the sonic response in the second testing volume to the sonic response in the first testing volume; and determining, based on the comparison of the sonic response in the second testing volume to the sonic response in the first testing volume, whether to initiate one or more responsive operations.

In a further exemplary embodiment, the one or more responsive operations include one or more of hot water cleaning of the water network, chemical disinfection of the water network, providing an audial or visual alarm to a user, initiating drainage of the water network, shutting off equipment within the water network, stopping or diverting flow of water within the water network, determining a location of contaminant entry, repeating a purification or filtering process of water in the water network, providing a recommendation to the user for network setting changes configured to improve disinfection efficacy, and linking to other water networks to compare bacterial measurements and/or trends.

In a further exemplary embodiment, the first testing volume is an in-line volume of the water network and the second testing volume is in a testing chamber separated from the water network by a diverter valve.

DETAILED DESCRIPTION

Figure 1:
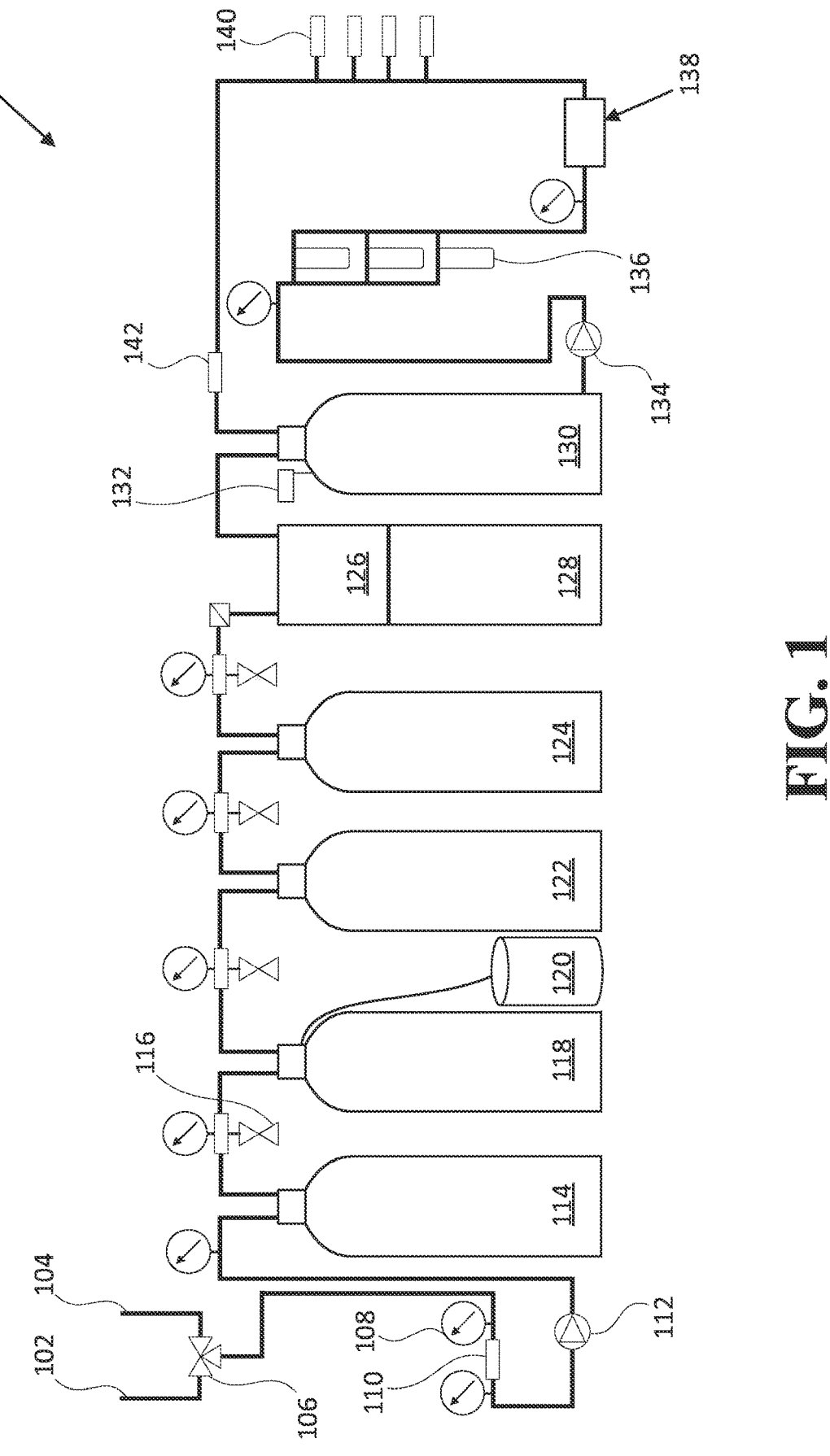
FIG. 1 illustrates an example of a hemodialysis water treatment system.

Exemplary embodiments of the present disclosure provide advantageous systems and methods for detecting bacteria in water and water-based liquids (e.g., solutions containing water), for example, as used in medical systems, such as dialysis systems used for dialysis treatments. It will be readily appreciated that references to water in the present disclosure do not refer exclusively to only pure water, but may, in some embodiments, refer to water-based liquids and/or solutions that contain water, such as (but not limited to) dialysate used for dialysis treatment.

In an embodiment, a method for detecting bacteria in water is provided. Swept-Frequency Acoustic Interferometry (SFAI) is a noninvasive fluid characterization technique that determines sound speed and sound attenuation in a fluid over a wide frequency range completely noninvasively from outside a container (e.g., pipe, tank etc.). As further described herein, SFAI may be used in connection with the detection of bacteria in water. The method includes emitting ultrasonic pulses into a water-based sample and measuring a sonic response, as ultrasonic sensors measuring the sonic response can be used to detect bacteria in the sample within 1 CFU per milliliter of precision in accordance with the present disclosure. Accordingly, the method provides excellent precision for detecting bacterial presence in water that is well suited for compliance with even extremely strict compliance and/or regulatory standards, such as in connection with preparation of dialysate for dialysis treatments. Furthermore, such precision allows for careful monitoring of CFU levels that can allow preventative actions to be taken well before contamination reaches critical levels. Because ultrasonic testing can be carried out in an in-line and integrated manner with existing pipe connections or using a diverter chamber, testing does not require a manually obtained sample to be placed in a petri dish. Furthermore, because no manual intervention is required and ultrasonic measurements can be taken quickly, water testing can be carried out more frequently without occupying the time or attention of facility staff and/or working professionals. In an embodiment, the method includes comparing one or more ultrasonic measurements to determine the location or severity of a bacterial contamination in water. Responsive operations may be carried out depending on the one or more ultrasonic measurements.

In an embodiment, a dialysis system is provided that includes an ultrasonic sensor configured to detect the sonic response of bacteria in water that are exposed to ultrasonic waves according to SFAI techniques. In some embodiments, the methods and systems disclosed in U.S. Pat. No. 7,228,740 entitled "Noninvasive characterization of a flowing multiphase fluid using ultrasonic interferometry," which is incorporated herein by reference, can be employed as informed by the present teachings to provide for use of the ultrasonic sensor in a sweep of the acoustic frequency, measuring the phase difference signal as a function of frequency, and analyzing the frequency dependence of the measured phase difference signal to obtain compositional information. The ultrasonic sensor may be configured to provide in-line bacterial presence measurements in a pipe or container of the dialysis system, such as in the RO system and/or components of a dialysis machine, and may be calibrated prior to use based to determine a correlation between detected sonic response in a particular location and CFU per milliliter (see, e.g., Zinin P V, Allen J S 3rd. Deformation of biological cells in the acoustic field of an oscillating bubble. Phys Rev E Stat Nonlin Soft Matter Phys. 2009 February; 79(2 Pt 1):021910. doi: 10.1103/Phys-RevE.79.021910. Epub 2009 Feb. 11. PMID: 19391781; PMCID: PMC3069351; and Zinin P V, Allen J S 3rd. Levin V M. Mechanical resonances of bacteria cells. Phys Rev E Stat Nonlin Soft Matter Phys. 2005 December; 72(6 Pt 1):061907. doi: 10.1103/PhysRevE.72.061907. Epub 2005 Dec. 12. PMID: 16485974, which are incorporated herein by reference).

In an embodiment, the calibration process includes determining a baseline signal to filter noise resulting from the material and geometry of piping at or near the ultrasonic testing volume, temperature of water in the pipe, and/or other characteristics of the ultrasonic sensor and its immediate environs that will affect the ultrasonic waves detected by the ultrasonic sensor. In some embodiments, ultrasonic sensors according to the present disclosure are re-calibrated after periodic external testing followed by a heat and chemical disinfection. In some embodiments, the ultrasonic sensor is configured to provide bacterial presence measurements of a sample diverted from a system into a testing chamber. Bacterial testing of water can thereby be conducted in a variety of systems, locations, and applications, as the ultrasonic sensor may be calibrated to detect bacteria in a versatile range of customizable pipes, containers, and chambers of varying dimensions.

In an embodiment, a first calibration point may be established immediately after a system-wide disinfection under full calibration settings (e.g., extra time/heat is used during the disinfection process to ensure the system is clean). Such a system-wide disinfection occurs periodically, and may occur, for example, once per month. A second calibration point is established after a predetermined period of time (e.g., a predetermined number of hours) passes from the first calibration point. A third calibration point is established immediately after a system-wide disinfection is carried out at a disinfection time and temperature set by a clinic. A fourth calibration point is established after the predetermined period of time passes from the third calibration point. As a result of establishing the foregoing calibration points, comparisons of the various calibration points enables determination of ideal microbial limits and acceptable microbial detection limits. For example, the first calibration point may provide for determination of an ideal baseline and the second calibration point may provide for determination of an ideal microbial limit. The third and fourth calibration points may then be compared to these ideal values to determine an acceptable limit before clinic-run system disinfection is required.

The ultrasonic sensors according to embodiments of the disclosure are configured to detect contaminants with sufficient precision to ensure compliance with quality requirements defined by commonly adopted standards. For example, standard dialysate is usually produced using water for dialysis meeting the quality requirements as defined in Association for the Advancement of Medical Instrumentation (AAMI) RD62 or as defined in International Organization for Standardization (ISO) 23500-5:2019. The dialysate (e.g., AAMI RD52) is checked by a clinic for unacceptable levels of microorganisms. The actions/processes that must be carried out if unacceptable levels of microorganisms are detected are the same between AAMI and ISO standards. The allowable levels of microorganisms for each standard are shown in Table 1, wherein an asterisk (*) indicates that an action level is set based on knowledge of the microbial dynamics of the system and typically the action level will be 50% of the maximum allowable level.

TABLE 1

| Test | AAMI RD52 (CMS Adoption) | | ISO/ANSI/AAMI 23500-5; 2019 | |
| --- | --- | --- | --- | --- |
| | Action | Limit | Action | Limit |
| Water Colony Count (CFU/mL) | 50 | 200 | 50* | 100 |
| Water Endotoxin (EU/mL) | 1 | 2 | 0.125* | 0.25 |
| Dialysate Colony Count (CFU/mL) | 50 | 200 | 50* | 100 |
| Dialysate Endotoxin (EU/mL) | 1 | 2 | 0.25* | 0.5 |
| Dialysate Colony Count (CFU/mL) | — | 0.1 | — | 0.1 |
| Dialysate Endotoxin (EU/mL) | — | 0.03 | — | 0.03 |

AAMI RD52 utilizes a multi-tier approach in determining the action plan that should be implemented and is dependent on the severity of the microbiological results. In the event that levels exceed the AAMI RD52 limit listed, a user is required to no longer use the device. ISO 23500-1 describes the use of low bacteria and endotoxin levels of dialysis water, produced by an RO unit, prior to mixing with acid and bicarbonate concentrates. The microbiological quality of the concentrates is capable of producing dialysis fluid (including substitution fluid) meeting the microbiological requirements of the ISO 23500 series, when used according to a manufacturer's instructions. Dialysis machines may use a validated process for making substitution fluids using the appropriate AAMI/ISO standard and the practiced Centers for Medicare & Medicaid Services (CMS) guidelines for dialysis water. The system may be validated to produce sterile, non-pyrogenic substitution fluid using quality requirements defined in AAMI RD52 for standard dialysate. RD52 standard dialysate can be produced by using water for dialysis meeting the quality requirements defined in AAMI RD62.

FIG. 1 illustrates an example of a hemodialysis water treatment system 100. The hemodialysis water treatment system 100 includes a temperature blend valve 106 for blending water from both a cold water source 102 and a hot water source 104, the blended water serving as a water source for the system 100. The temperature blend valve 106 may include a thermometer or operate in connection with measurements provided by a separate thermometer in order to ensure maintain a proper blend corresponding to a desired water temperature in the system 100. The blended water is then directed to a pressure gauge 108 for monitoring a pressure of the water input to the system and through a backflow preventer 110. It will be readily understood that the system 100 includes a plurality of pressure gauges at various locations in order to closely monitor the water pressure throughout the system with a high degree of accuracy and control.

Downstream of the backflow preventer 110, water is passed through a booster pump 112 and subsequently to a multimedia tank 114 may be used to inject hydrochloric acid to correct the pH of the water if excess alkalinity is detected, as excess alkalinity can disturb carbon adsorption beds and the reverse osmosis (RO) membrane of the system 100. A sampling point 116 is included to monitor water content after treatment via multimedia tank 114. As with the various pressure gauges illustrated in FIG. 1, a plurality of sampling points are also illustrated, particularly after each tank in a system, so that water content can be sampled and monitored throughout the system. The water is then passed through a water softener 118 that exchanges calcium and magnesium for sodium that has been affixed to a resin bed. Water softeners reduce accumulation of calcium and magnesium salts, thereby prolonging the useful life of the RO membrane of the system 100. A brine tank 120 is configured to aid in water softening by holding a salt solution for flushing the water softener tank 118, replacing calcium and magnesium ions with sodium.

The water is then to a primary carbon tank 122 and subsequently a secondary carbon tank 124. The carbon tanks 122, 124 provide for carbon adsorption, through which activated carbon removes chlorine, chloramines, and other dissolved organic contaminants from the water. The secondary carbon tank 124 is used to ensure complete removal of chloramine from the water. The water is then directed to a RO device 126, which includes one or more filters 128 placed upstream of an RO membrane to catch carbon particles and/or resin beads that may have inadvertently been released by the previous treatment of the water. The RO membrane of the RO device 126 serves a central purpose in the purification of dialysis water. Hydrostatic pressure is used to drive water across semipermeable membranes that can exclude at least 90 percent of contaminants present in the water. This process removes not only ionic contaminants, but also bacteria and endotoxins. Deionization (DI) may also be implemented to remove ionic contaminants by exchanging cations for hydrons and anions for hydroxide. The exchanged hydrons and hydroxide combine to become water. DI may be used to purify water when the RO membrane fails. It may also be used in addition to the purification provided by the RO membrane. However, water processing through DI requires bacteria filters after DI purification because DI systems tend to promote bacterial growth. Furthermore, DI membranes are saturable and thus require continuous monitoring in terms of their conductivity. Mechanisms for diverting RO water when conductivity exceeds 1 microS/cm must be implemented to avoid breakthrough of fatal contaminants, such as fluoride.

After purification through the RO device 126, water is directed to a storage tank 130 having a vent filter 132. Purified water from the storage tank 130 is sent through a distribution pump 134, through which it is then directed to endotoxin filters 136. After passing through the endotoxin filters 136, the water is monitored via a final quality meter 138 before it is then distributed to individual dialysis machines 140 to produce dialysate solution that is free of contaminants. Water returned from the dialysis machines 140 (or other devices for different uses other than dialysis) is then returned back to the storage tank and is monitored by a water return flow meter 142.

Inert materials, such as plastics, are used to avoid further chemical contamination. Water piping systems must be carefully configured to avoid bacterial contamination via regular disinfection to prevent bacterial growth within the system and to minimize potential biofilm formation. However, despite the foregoing measures being taken, contaminants and bacteria are not always completely eliminated from the water by the system 100. Furthermore, the return path of water to the storage tank 130 after the final quality meter 138 may introduce additional contaminants into the water and even into the storage tank 130, which is downstream of the RO device 126. Thus, frequent heat disinfection and testing must be performed to ensure that contaminants remain below acceptable levels which may be determined by compliance standards and/or administrative regulations. Testing can be time-consuming and cumbersome, and requires manual work to be performed by clinic staff and/or clinicians, putting a strain on the limited time and resources of clinics and clinic staff. This is particularly burdensome for clinic staff who are otherwise occupied closely monitoring dialysis patients for signs of hemolytic, pyrogenic, or other reactions, all of which may be symptoms of RO water contamination. There is also little feedback on the efficacy of existing disinfection programs with potential waste in energy consumed and excess chemical usage, which can shorten the life of system components.

Figure 2:
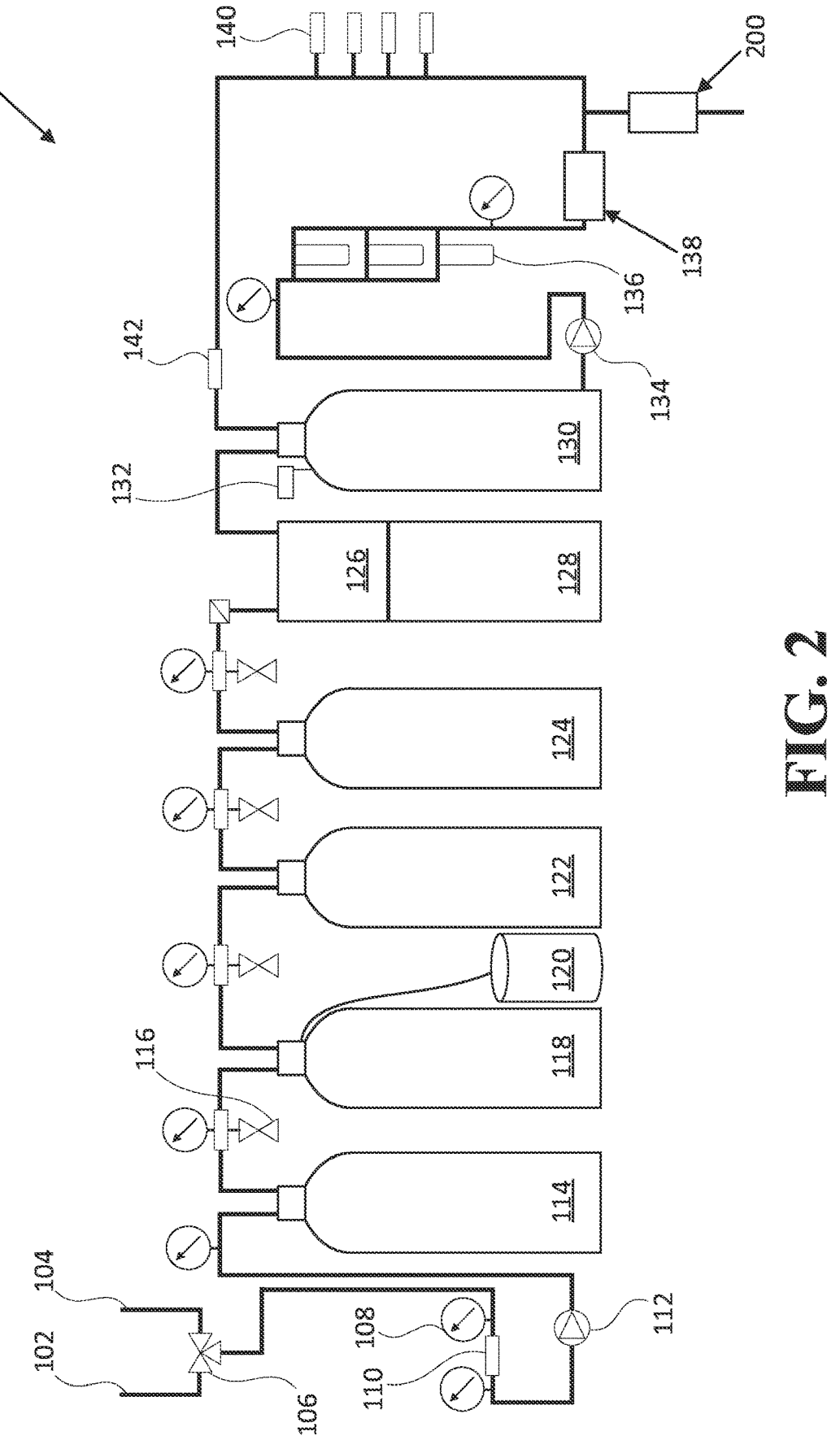
FIG. 2 illustrates an example of a hemodialysis water treatment system with an ultrasonic testing chamber according to an embodiment of the present disclosure.

FIG. 2 illustrates an example of a hemodialysis water treatment system with an ultrasonic testing chamber according to an embodiment of the present disclosure. The system is similar to that described above with reference to FIG. 1, but further comprises an ultrasonic testing system 200. The ultrasonic testing system 200 is placed downstream of the final quality meter 138 and upstream of the dialysis machines 140. It will be readily appreciated, however, that more than one ultrasonic testing system may be implemented in a hemodialysis or other water processing system at various locations as preferred. Arrangement of the ultrasonic testing system 200 as illustrated in FIG. 2 allows for further verification of the quality of water before its use by dialysis machines 140, thereby ensuring it is safe as close to its use for dialysis as possible.

Figure 3A:
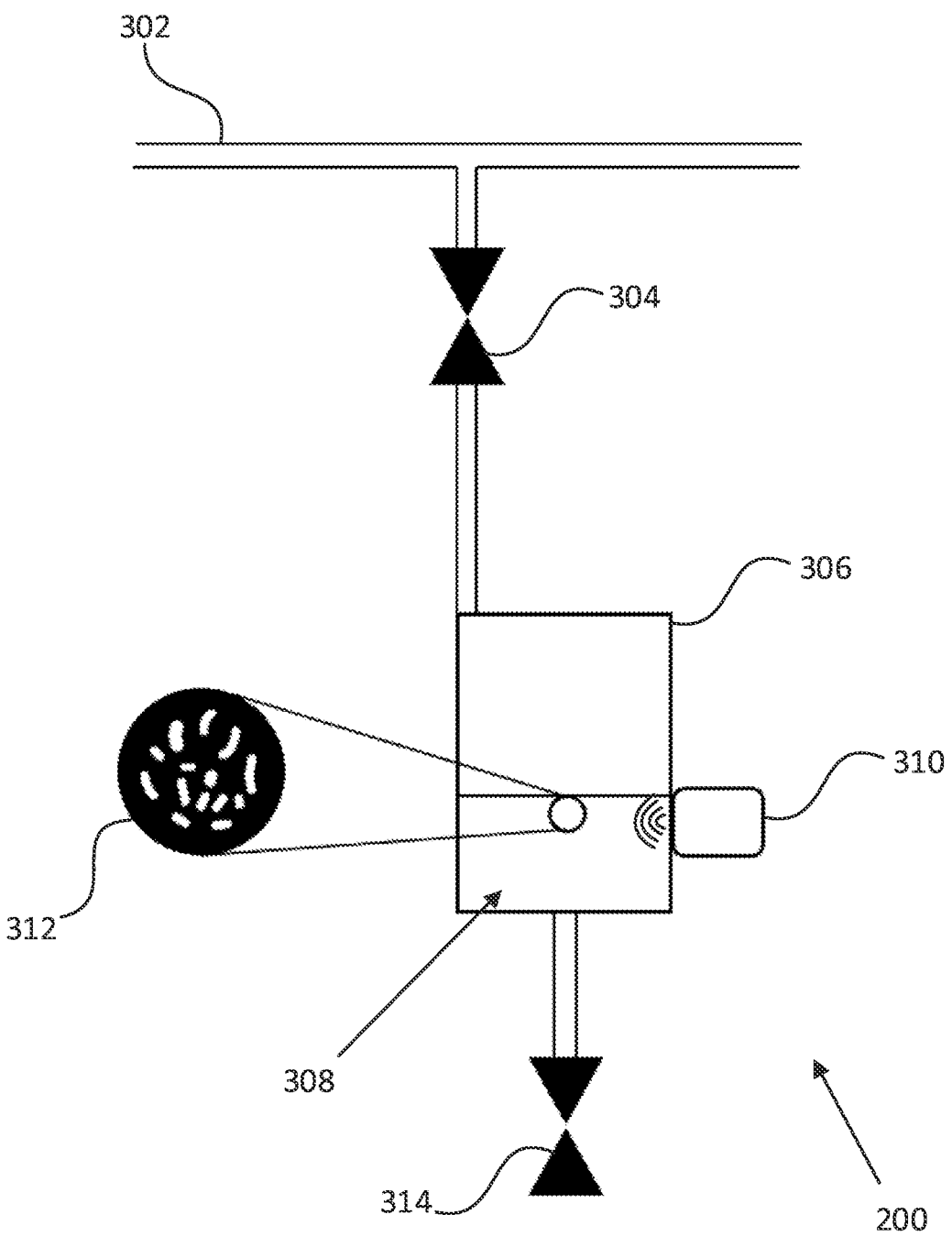
FIG. 3A schematically illustrates an example of an ultrasonic testing chamber according to an embodiment of the present disclosure.

FIG. 3A schematically illustrates an example of the ultrasonic testing system 200 illustrated in FIG. 2 according to an embodiment of the present disclosure. The main line 302 from the system that feeds water to the dialysis machines 140 also diverts water to a diverter valve 304. The diverter valve 304 may be manually, autonomously, or remotely operated. For example, in an automated system, a controller may be configured to periodically open the diverter valve 304 to divert a new sample of water for testing from the main line 302. Water is diverted by the diverter valve 304 to a testing chamber 306 to form a test sample 308 of water. An ultrasonic tester 310 is configured to emit ultrasonic waves toward the test sample 308 and to detect a corresponding sonic response. Ultrasonic waves are emitted from the ultrasonic tester 310 in the form of pulses. When agitated by an ultrasonic pulse, bacteria 312 present in the test sample 308 produce a distinct sonic response, the magnitude of which can be detected by the ultrasonic tester 310. The magnitude of the sonic response of the bacteria 312 is indicative of the amount of bacteria 312 present in the test sample 308. Accordingly, by determining the magnitude of the sonic response, an amount of bacteria in the test sample 308 (which is indicative of the amount of bacteria in the storage tank 130), the ultrasonic testing system 200 can determine whether the water is safe for use in dialysis machines 140 and can further determine whether or not the water purification system is functioning properly in terms of its intended purpose of purifying the water for safe dialysis use. The ultrasonic testing system 200 further includes a drainage valve 314 to allow drainage of the testing chamber 306, thereby allowing the testing chamber 306 to be filled with a new test sample 308 from new water via main line 302.

The ultrasonic testing system 200 is capable of detecting bacterial presence within a sample within 1 CFU per ml. The standard threshold for safe water purification for hemodialysis is 50 CFU per ml in Europe and 100 CFU per ml in the United States. Accordingly, the ultrasonic testing system 200 can detect bacterial presence well before safety-critical bacteria levels are reached and enable preventative action to be taken without requiring system stoppage or disruptive intervention. In some embodiments, the ultrasonic testing system 200 can be linked to a system configured to provide clinicians with notifications, alerts, and/or warnings regarding water contamination levels. In some embodiments, the ultrasonic testing system 200 can also be linked to the dialysis machines 140 to alert them that heat disinfection cycles should be increased in frequency and/or duration until RO system water quality improves to acceptable levels.

In an embodiment, the ultrasonic testing system 200 is arranged within a dialysis machine itself, and configured to measure bacterial contamination of any water source received through an inlet of the device. This would ensure that bacterial contamination could be detected regardless of what purification system the dialysis machine is connected to, making the dialysis machine more useful in a wider number of clinics and settings. Furthermore, the foregoing provides clinicians and clinic staff to be notified or alerted to the condition of on-site purification system water without having to install any hardware to the purification system itself. In at-home dialysis treatment, such a dialysis machine would be particularly beneficial, as residential water quality may vary substantially from day-to-day based on local circumstances.

Figure 3B:
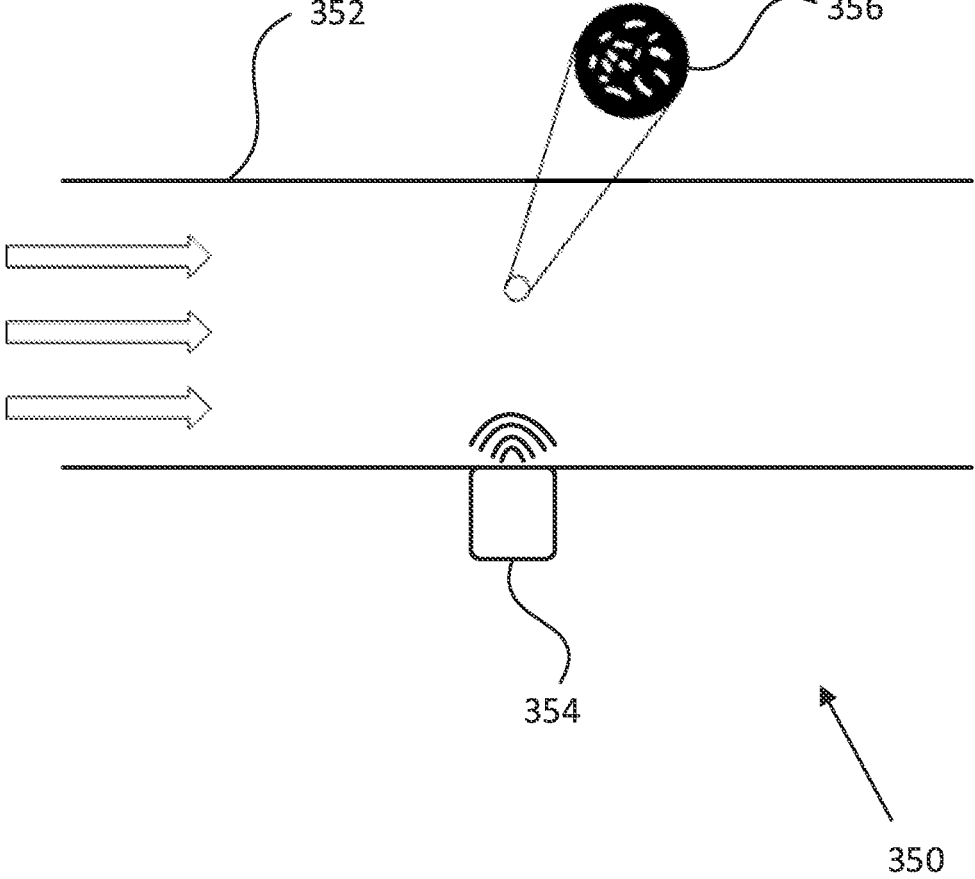
FIG. 3B schematically illustrates an example of an in-line ultrasonic testing system according to an embodiment of the present disclosure.

In the embodiment illustrated in FIGS. 2 and 3A, the ultrasonic testing system 200 is configured to divert water in order to fill the testing chamber. It will be readily appreciated, however, that the ultrasonic testing system can also be configured as an in-line testing system by simply requiring all water to pass through an ultrasonic testing chamber or by using a pipe itself as the testing chamber. FIG. 3B illustrates an example of an embodiment of an in-line ultrasonic testing system 350. An ultrasonic testing device 354 is arranged on or near a pipe 352 through which water flows. The ultrasonic testing device 354 is configured to emit ultrasonic waves into the flowing water and to detect, via an ultrasonic sensor, the sonic response of bacteria 356 in the water. Because the ultrasonic testing device 354 is configured to take in-line bacterial presence measurements while water flows through pipe 352, real-time CFU measurements may be calculated to provide real-time contamination status information. In such an embodiment, ultrasonic testing may be carried in a manner that eliminates the risks associated with contamination from a diverter valve and its accompanying piping. Furthermore, while diverted testing chambers may also be cleaned and flushed together with the rest of the system, an in-line testing chamber may be more readily cleaned and flushed without requiring additional steps (e.g., opening of diverter valve and drainage valve).

In the foregoing illustrated embodiments, a water purification system and ultrasonic testing system are provided for application in hemodialysis. It will be readily appreciated, however, that although the benefits of the ultrasonic testing system are particularly apparent in terms of maintaining safe water purification for hemodialysis, that the ultrasonic testing system can likewise be used in other applications involving water and/or other liquids that require bacterial monitoring.

Figure 4A:
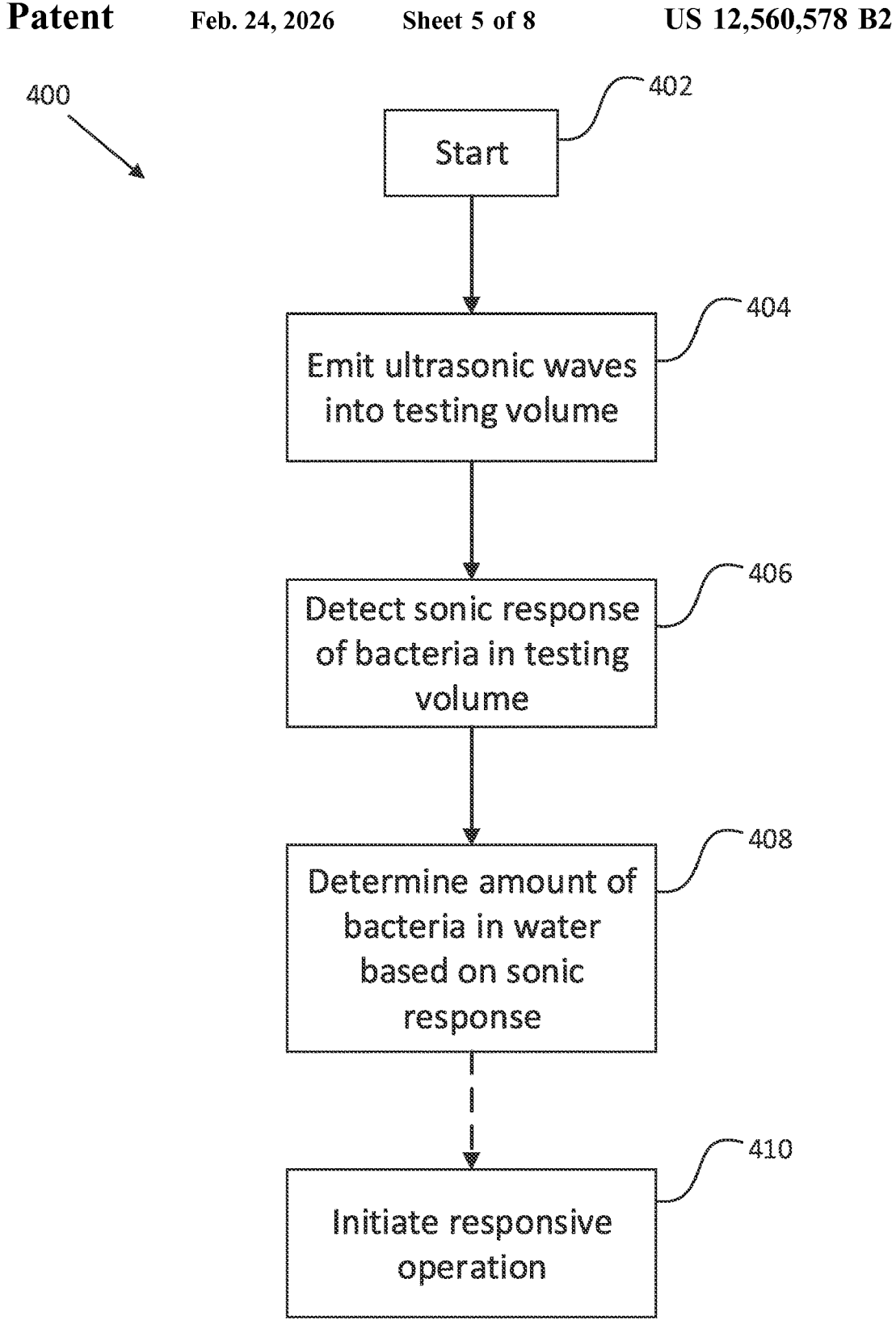
FIG. 4A illustrates a water testing method according to an embodiment of the present disclosure.

FIG. 4A illustrates a water testing method 400 according to an embodiment of the present disclosure. The method is initiated at start 402, after which in step 404, ultrasonic waves are emitted into water in a testing volume. In a subsequent step 406, the sonic response of bacteria in the water of the testing volume is detected with an ultrasonic sensor. In step 408, an amount of bacteria present in the water of the testing volume is determined based on the detected sonic response. The determination may be made by a processor configured to filter and process signals received from the ultrasonic sensor, thereby converting signals corresponding to the sonic response to a bacterial amount measurement. In some embodiments, the determined amount is based on previously conducted calibration of the ultrasonic sensor to the testing volume with samples having known bacterial content. The amount of bacteria detected may be measured in CFUs per milliliter or another bacterial content metric. In some embodiments, optional step 410 is carried out in which an automated responsive operation is carried out based on the determined amount of bacteria in the water of the testing volume. If the determined amount of bacteria is within an acceptable range, for instance, the responsive operation may include simply storing the measurement and setting a status signal indicative of a nominal reading. If the determined amount of bacteria is not within an acceptable range, the responsive operation may include initiating automated systems that intervene to reduce bacterial contamination in the water of the testing volume (or of water in a connected network) or to prevent distribution of the contaminated water from a network connected to the testing volume.

Figure 4B:
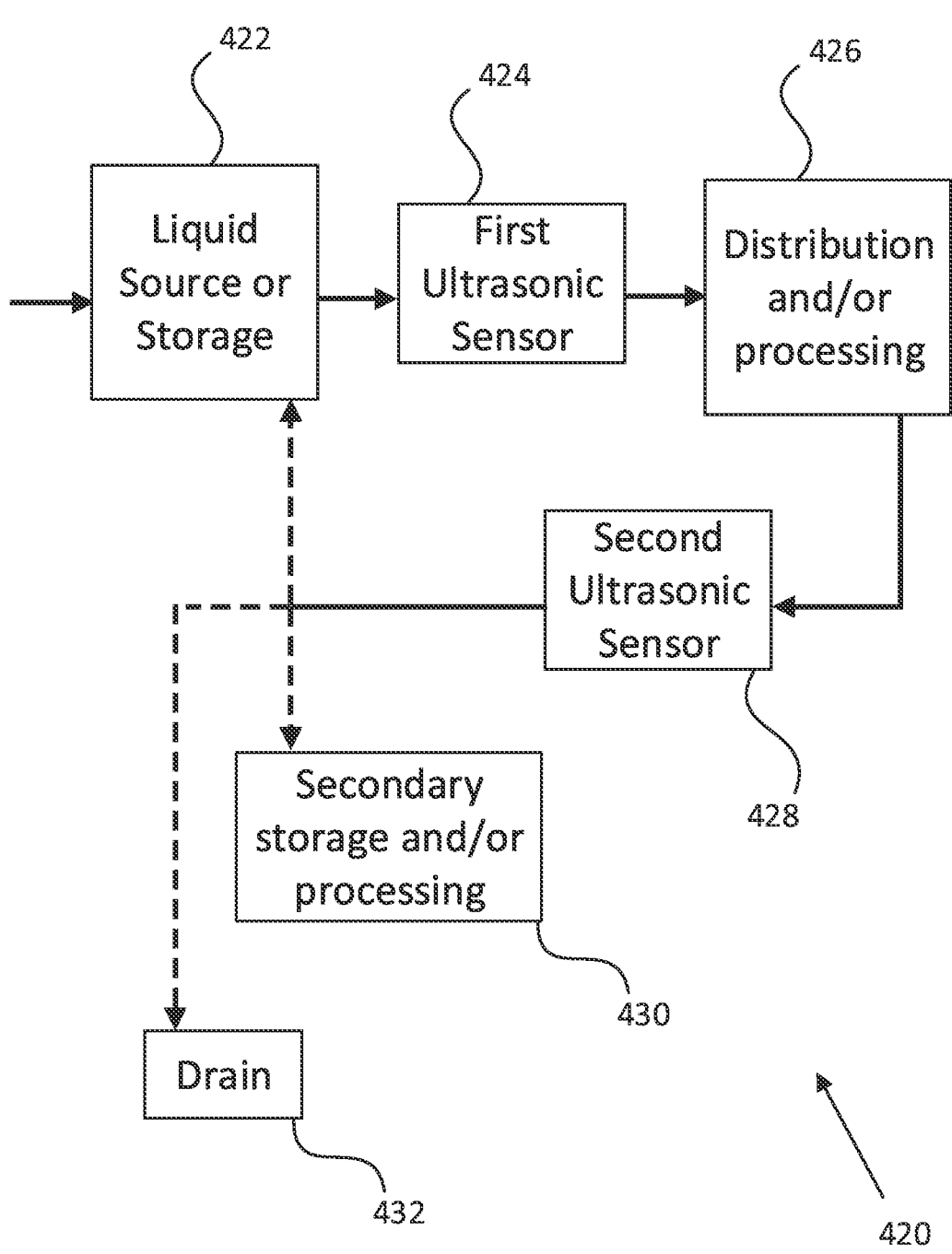
FIG. 4B schematically illustrates an example of a water testing methodology according to an embodiment of the present disclosure.

FIG. 4B schematically illustrates an example of a water testing methodology 420 according to an embodiment of the present disclosure. In a first step 422, a liquid is received from a liquid source (e.g., a tap or liquid production process) or a liquid storage (e.g., a tank or other container storing the liquid). In a second step 424, the liquid is then tested via a first ultrasonic sensor, which can be implemented as part of a diverted testing chamber or an in-line testing chamber. In a third step 426, the liquid is then distributed and/or processed according to the requirements of the particular system. For example, in a tap water drinking utility, the water may be distributed to a point of use, or in a beverage production facility, water may be purified for use as an ingredient. In a fourth step 428, the liquid is then tested via a second ultrasonic sensor, which can be implemented as part of a diverted testing chamber or an in-line testing chamber. The first and second ultrasonic sensors can be configured to communicate via wired or wireless communication with a computer, the computer being configured to receive and store signals from the first and second ultrasonic sensors. Testing via the at least two ultrasonic sensors allows a first bacteria measurement and a second bacteria measurement to be made, enabling comparative analysis that may provide important insights.

For example, if the second ultrasonic sensor detects a higher quantity of bacteria than the first ultrasonic sensor, then it can be determined that the bacterial growth is the result of contamination in the distribution and/or processing system of the third step 426. Thus, a computer receiving signals from the first and second ultrasonic sensors can determine that the distribution and/or processing of the liquid is the source of contamination and may provide a corresponding alert to a user, audial or visual, and may further provide a diagnosis (e.g., that a purification system or filter in the distribution and/or processing system is malfunctioning or in need of replacement) and/or instructions for taking corrective action. In an embodiment, the computer may automatically provide for corrective action by sending signals to a further system configured to implement the corrective action. For example, the computer may send a signal initiating a hot water cleaning to kill bacteria, actuating a drainage valve to drain the contaminated water, shut off a downstream distribution outlet or system, and/or flush the distribution and/or processing system.

If the first ultrasonic sensor detects an amount of bacteria that is above a predetermined or dynamically set threshold, this may indicate that the liquid source or liquid storage upstream of the first ultrasonic sensor is contaminated. Consistent with embodiments described above, corrective action may thus be taken with regard to the liquid source or storage. If the first ultrasonic sensor detects an amount of bacteria that is higher (but within acceptable limits) than an amount detected by the second ultrasonic sensor, then this may indicate that the purification measures within the distribution and/or processing of the liquid are functioning properly (e.g., that filters configured to reduce bacterial presence are properly reducing bacterial presence). While corrective action may not be necessary, such data is useful for determining a status of the liquid system and can be useful for system monitoring.

Depending on the particular liquid distribution/processing system and on the outcome of a comparative analysis of the first and second ultrasonic sensor measurements, the liquid may later be directed in a number of ways. If the liquid is determined to be contaminated (or if the liquid has served its useful purpose in the system), the liquid may be drained 432. In some embodiments, the liquid may be directed to a secondary storage and/or processing 430. In some embodiments, the liquid is diverted to the secondary storage and/or processing 430 as a safety and/or testing measure (e.g., to hold contaminated water for further testing or isolated safekeeping). In some embodiments, the liquid is directed back to the liquid source or storage of step 422.

In an embodiment, the first and second ultrasonic sensors are included within a hemodialysis machine at its inlet and outlet, respectively. As a result, the efficacy of a disinfection cycle carried out by the hemodialysis machine can be assessed. Effluent samples can be taken automatically and correlated with a unique identification associated with particular anonymized patients to ensure standardization of measurements, as patient effluent varies based on waste dialyzed from blood that is used to feed bacteria in the hemodialysis machine's hydraulics. This allows a system to generate a complete picture of how effective the disinfection cycles of the dialysis machine, based on how much bacteria, on average, is leaving the hemodialysis machine. Furthermore, in an embodiment employing multiple ultrasonic sensors, time-stamped recording of measurement data and data analysis may be carried out in a system, thereby allowing for system trouble shooting and identification of entry point(s) of a bacterial contaminant into the system. Specifically, an increase of bacterial contamination as detected by a first of a plurality of ultrasonic sensors that is downstream of one or more of the plurality of sensors will indicate that a contaminant is entering the system upstream of the first ultrasonic sensor. Depending on whether or not other ultrasonic sensors upstream of the first ultrasonic sensor are also detecting similar degrees of contamination, a specific entry point or a portion of the system between ultrasonic sensors may be identified as the location of contaminant entry that needs to be more closely monitored, disinfected, maintained, and/or repaired.

If it is determined that CFU measurements are rising regardless of which patients are connected to the machine, a system operator could be alerted and heat disinfection cycle times could be increased to prevent biofilm buildup in the machine. The foregoing features advantageously reduce the need for destructive chemicals, such as bleach, to be used to clean the machines and strip away biofilm. In a typical hemodialysis machine heat disinfection operation, a water temperature of 80 degrees Celsius is held in the machine for ten minutes. In an illustrative embodiment, a hemodialysis machine with ultrasonic sensors as described in the preceding examples could increase the duration of the heat disinfection operation to an hour based on rising bacteria levels being detected. In an embodiment, the heating disinfection operation duration may be increased for as long as required in order to bring CFU measurements from the ultrasonic sensors within acceptable levels. In some embodiments, heating disinfection operation duration may also be decreased to save energy if CFU measurements from the ultrasonic sensors indicate that CFU levels are minimal and do not require correction. In some embodiments, more than two ultrasonic sensors may be used to provide more granular monitoring of CFU levels throughout a hemodialysis machine or other system. As a result, disinfecting operations may be carried out with more precision, thereby saving energy by targeting only locations where disinfection is detected as being necessary.

It will be appreciated that the examples of systems depicted in FIGS. 1-4 are merely illustrative examples, and that the principles of the present disclosure are not limited thereto. The principles discussed herein may also be applied to other types and configurations of systems for which accurate and fast detection of bacteria in liquids is useful.

Figure 5:
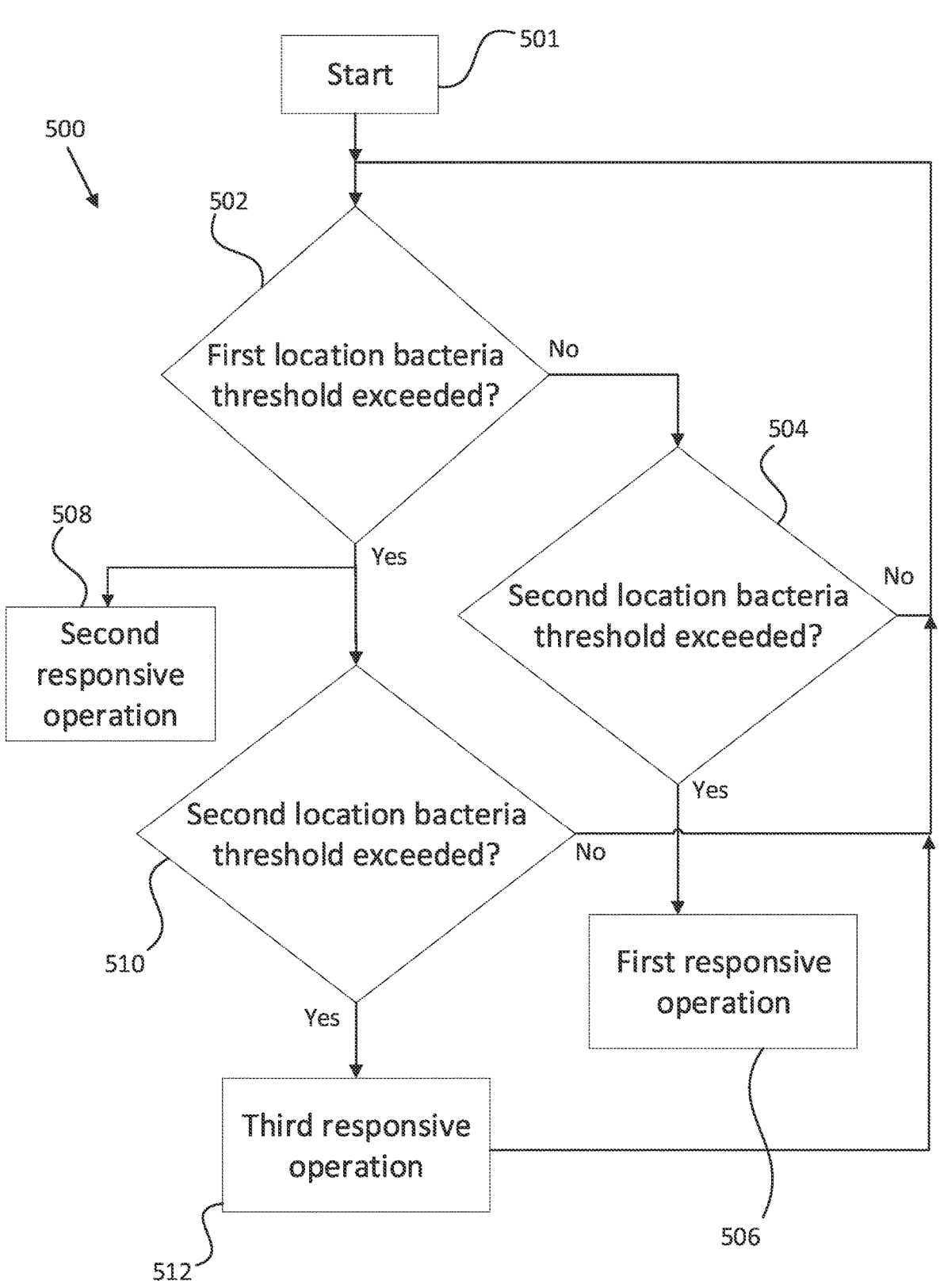
FIG. 5 illustrates a flowchart for an example of a water testing method including two ultrasonic sensors according to an embodiment of the present disclosure.

FIG. 5 illustrates a flowchart 500 for an example of a water testing method including two ultrasonic sensors according to an embodiment of the present disclosure. The method may be implemented with a computer configured to receive signals from a first ultrasonic sensor at a first location and a second ultrasonic sensor at a second location. At start 501, the method begins by a query 502 as to whether a first location bacteria threshold is exceeded. The threshold may be a predetermined threshold, and may be based on a compliance or safety standard or regulation. In some embodiments, the threshold is a dynamic threshold that may change over time and dependent on inputs. For example, the threshold may begin at a first value indicating a low threat level and, upon being met, may be increased to a second value indicating an intermediate and/or higher threat level. If the first location bacteria threshold is not exceeded, query 504 is carried out to determine if a second location bacteria threshold is exceeded. If not, then the system monitored via the method is operating nominally and no responsive or corrective operation is required. The method can then be repeated, either immediately, based on a time delay, or based on a predetermined schedule. If in query 504 it is determined that the second location bacteria threshold is exceeded, then a first responsive operation 506 is carried out. The first responsive operation 506 is an operation configured to address potential contamination and/or malfunction in a location within a liquid network between the first location and the second location. For instance, the first responsive operation 506 may comprise a cleaning operation that flushes a water network between the first location and the second location with hot water and/or disinfecting agents in order to eliminate bacteria in the respective portion of the network. Exemplary responsive operations may also include one or more of: diverting treated water for a repeated pass through the entire system; analyzing time and conditions of a previous system disinfection to provide a recommendation for system setting changes that will improve disinfection efficacy; and linking to other water purification systems, whether remote or local, to determine if similar bacterial increases or trends exist and thereby alert operators of linked systems that disinfection should be carried out or that disinfection times should be increased until testing confirms that a threat has passed.

If it is determined based on query 502 that the first location bacteria threshold is exceeded, then a second responsive operation 508 is carried out. The second responsive operation 508 may be directed to corrective measures within the network upstream of the first location. In some embodiments, the second responsive operation 508 is directed to a corrective measure within more than a portion of the network upstream of the first location, or even the entire network, as an initial contamination may require complete purging, cleaning, and/or shutdown in order to address potential downstream contamination. If it is determined based on query 502 that the first location bacteria threshold is exceeded, then a further query 510 is also carried out to determine whether the second location bacteria threshold is exceeded. If not, then no further action may be needed, and the method can start from the beginning. If the second location bacteria threshold is exceeded, then a third responsive operation 512 may be carried out. Although the specific responsive operation 512 may be customized according to the needs of a particular liquid network/system, the third responsive operation 512 is often indicative of a network-wide malfunction and/or contamination, as both the first and second location of the network include bacteria that is above the threshold. In some embodiments, the third responsive operation 512 may be a full system shutdown in order to eliminate the potential consequences of bacteria reaching a downstream outlet or consumption point. In some embodiments, after third responsive operation 512 is initiated and/or carried out, the method begins again from start 501 for continued monitoring of bacteria levels at the first and second locations of the network.

Figure 6:
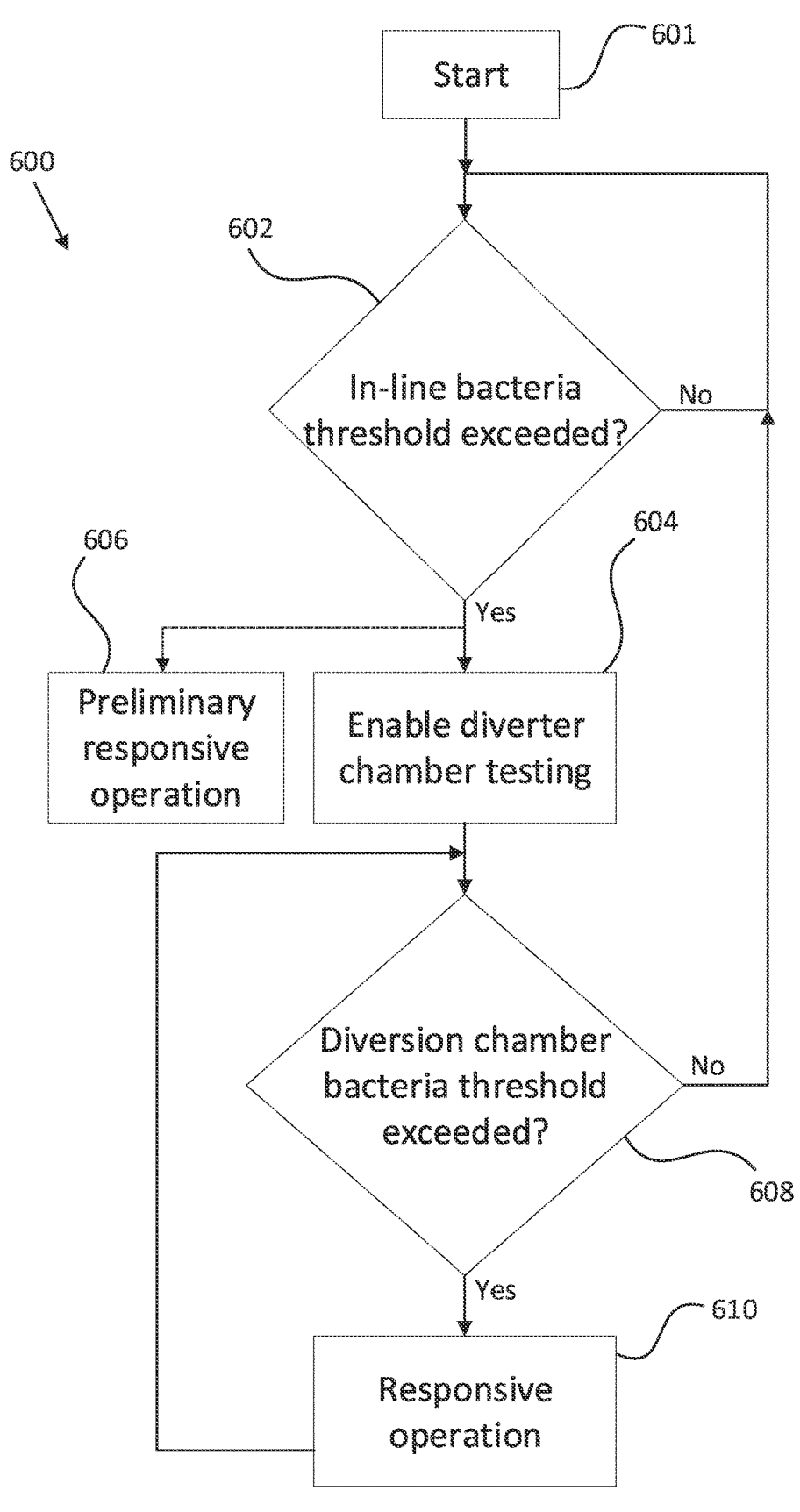
FIG. 6 illustrates a flowchart for an example of a water testing method including an in-line ultrasonic sensor according to an embodiment of the present disclosure.

FIG. 6 illustrates a flowchart 600 for an example of a water testing method including an in-line ultrasonic sensor according to an embodiment of the present disclosure. In the illustrated embodiment, a liquid network includes both an in-line ultrasonic sensor and a diverter chamber ultrasonic sensor. In some instances diverter chamber testing may provide more accurate results than in-line testing. For example, if liquid flow velocity is too high and or too variable over short time periods, diverter chamber testing may provide a more accurate representation of an average bacterial contamination amount. Ultrasonic measurement noise may also be greater when liquid is flowing, while less noise needs to be filtered when a liquid is sitting still in a testing chamber. Furthermore, while in-line testing may provide real-time ultrasonic measurements, allowing for bacterial growth in a testing chamber can provide more precise determinations of CFU levels present in a sample. The flowchart 600 therefore considers a method for handling both in-line and diverter chamber testing.

At start 601, the method begins by carrying out query 602 to determine whether an in-line bacteria threshold is exceeded. If not, then no further testing is required, and the method can be repeated from the beginning for continual or period testing. If it is determined that the in-line bacteria threshold is exceeded, then in step 604, diverter chamber testing is enabled. Step 604 may comprise, for example, actuating a diverter valve to allow a sample from the network to be diverted into a testing chamber. In some embodiments, if in-line bacteria amounts exceed a threshold in query 602, a preliminary responsive operation 606 may be initiated. This may include, for example, an audial alarm or warning and/or a visual warning issued to a user via a display. The foregoing alarms and/or warnings would serve as a preliminary warning to a user that a bacteria threshold may be exceeded, and that a diverter chamber test will be initiated for confirmation. In some embodiments, the preliminary responsive operation may include a setting a flag or saving a system status in a memory to create a history incidents in which the in-line bacteria threshold was exceeded, but otherwise may not include alarms and/or warnings due to the unconfirmed nature of the bacteria detection.

After diverter chamber testing is enabled in step 604, diverter chamber testing is carried out. Query 608 is then carried out to determine whether the diverter chamber bacteria threshold is exceeded. If not, no further action is required and the method is repeated from the beginning for continued monitoring. If the diverter chamber bacteria threshold is exceeded, then a responsive operation 610 is initiated. Due to the potential severity of the diverter chamber bacteria threshold being exceeded, diverter chamber testing may be repeated, along with query 608, until it is determined that bacteria levels have decreased below the threshold. In some embodiments, the method may instead be repeated from the beginning after responsive operation 610.

It will be appreciated that the execution of the various machine-implemented processes and steps described herein may occur via the execution, by one or more respective processors, of processor-executable instructions stored on one or more tangible, non-transitory computer-readable mediums (such as random access memory (RAM), read-only memory (ROM), programmable read-only memory (PROM), and/or another electronic memory mechanism). Thus, for example, operations performed by various components, apparatuses, or devices discussed herein may be carried out and facilitated according to instructions stored on and/or applications installed on one or more respective computing devices.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A medical system for detecting bacteria in water, comprising:
    a water distribution or processing system;
    an inlet for receiving water into the water distribution or processing system;
    an outlet for expelling water from the water distribution or processing system;
    at least two ultrasonic testing systems, each ultrasonic testing system including:
        an ultrasonic emitter configured to emit ultrasonic waves into a testing volume containing water, and
        an ultrasonic sensor configured to detect a sonic response of bacteria in the testing volume based on ultrasonic waves emitted by the ultrasonic emitter; and
    a processor configured to:
        receive signals corresponding to a detected sonic response from the ultrasonic sensor of each of the at least two ultrasonic testing systems,
        compare the detected sonic responses, and
        determine, based on the comparison of the detected sonic responses, whether to initiate one or more responsive operations,
    wherein at least one of the ultrasonic testing systems is arranged at the inlet or the outlet, and
    wherein the at least two ultrasonic testing systems are configured to emit ultrasonic waves into different testing volumes.

2. The system of claim 1, wherein the water distribution or processing system includes a reverse osmosis system.

3. The system of claim 1, further comprising a dialysis machine, and wherein the water distribution or processing system is coupled to the dialysis machine.

4. The system of claim 1, wherein at least one of the ultrasonic testing systems is configured for in-line testing of water, the ultrasonic emitter and the ultrasonic sensor of the at least one ultrasonic testing system being arranged on or adjacent a pipe, and wherein the testing volume of the at least one ultrasonic testing system is within the pipe.

5. The system of claim 1, wherein the at least one ultrasonic testing system arranged at the inlet or the outlet includes a testing chamber, the testing chamber being separated from the inlet or the outlet by a diverter valve,
    wherein the testing volume of the at least one ultrasonic testing system arranged at the inlet or the outlet is within the testing chamber, and wherein the ultrasonic emitter and the ultrasonic sensor of the at least one ultrasonic testing system arranged at the inlet or the outlet are arranged adjacent to the testing chamber.

6. The system of claim 1, wherein a first ultrasonic testing system of the at least two ultrasonic testing systems is arranged at the inlet and a second ultrasonic testing system of the at least two ultrasonic testing systems is arranged at the outlet.

7. The system of claim 1, wherein the processor is configured to correlate the signals received from each of the at least two ultrasonic sensors to a colony forming unit (CFU) measurement.

8. The system of claim 7, wherein the processor is configured to determine whether each CFU measurement exceeds one or more predetermined threshold values, and wherein the processor is configured to initiate the one or more responsive operations based on whether any CFU measurement exceeds the one or more predetermined threshold values.

9. The system of claim 1, wherein a first of the at least two ultrasonic testing systems is configured for in-line testing and a second of the at least two ultrasonic testing systems includes a testing chamber separated from the inlet or the outlet by a diverter valve.

10. The system of claim 1, wherein the one or more responsive operations include one or more of:
    hot water cleaning of the water network,
    chemical disinfection of the water network,
    providing an audial or visual alarm to a user,
    initiating drainage of the water network,
    shutting off equipment within the water network,
    stopping or diverting flow of water within the water network,
    determining a location of contaminant entry,
    repeating a purification or filtering process of water in the water network,
    providing a recommendation to the user for network setting changes configured to improve disinfection efficacy,
    linking to other water networks to compare bacterial measurements and/or trends, or
    storing data corresponding to the detected and compared sonic responses.

11. A method for monitoring a bacterial presence in a water network, comprising:
    emitting, by a first ultrasonic emitter, ultrasonic waves into a first testing volume containing water;
    detecting, by a first ultrasonic sensor, a sonic response of bacteria in the first testing volume to the emitted ultrasonic waves;
    determining, by a processor, an amount of bacteria in the water based on the detected sonic response;
    emitting, by a second ultrasonic emitter, ultrasonic waves into a second testing volume containing water;
    detecting, by a second ultrasonic sensor, a sonic response of bacteria in the second testing volume to the emitted ultrasonic waves;
    comparing, by the processor, the sonic response in the second testing volume to the sonic response in the first testing volume; and
    determining, by the processor, based on the comparison of the sonic response in the second testing volume to the sonic response in the first testing volume, whether to initiate one or more responsive operations.

12. The method of claim 11, wherein determining the amount of bacteria in the water comprises:

correlating the sonic response with a colony forming unit (CFU) measurement.

13. The method of claim 11, wherein the one or more responsive operations include one or more of:

hot water cleaning of the water network, chemical disinfection of the water network, providing an audial or visual alarm to a user, initiating drainage of the water network, shutting off equipment within the water network, stopping or diverting flow of water within the water network, determining a location of contaminant entry, repeating a purification or filtering process of water in the water network, providing a recommendation to the user for network setting changes configured to improve disinfection efficacy, linking to other water networks to compare bacterial measurements and/or trends, or storing data corresponding to the detected and compared sonic responses.

14. The method of claim 11, wherein the first testing volume is an in-line volume of the water network and the second testing volume is in a testing chamber separated from the water network by a diverter valve.

15. The method of claim 12, further comprising:

determining, by the processor, whether each CFU measurement exceeds one or more predetermined threshold values, and wherein the processor is configured to initiate the one or more responsive operations based on whether any CFU measurement exceeds the one or more predetermined threshold values.

16. The method of claim 15, further comprising:

initiating, by the processor, a first responsive operation based on a first CFU measurement exceeding a first predetermined threshold; and initiating, by the processor, a second responsive operation based on a second CFU measurement exceeding a second predetermined threshold, the first responsive operation being different than the second responsive operation.

17. The method of claim 15, further comprising:

initiating, by the processor, the one or more responsive operations based on at least two of the CFU measurements exceeding the one or more predetermined threshold values.

18. The method of claim 11, wherein the first ultrasonic emitter at an inlet or an outlet of the water network.

19. The method of claim 11, wherein the first ultrasonic emitter is arranged upstream of a dialysis machine, and wherein the water network is fluidically coupled to the dialysis machine.

20. A non-transitory computer-readable medium having processor-executable instructions stored thereon, wherein the processor-executable instructions, when executed by one or more processors, facilitate performance of a method for monitoring a bacterial presence in a water network, comprising:

emitting, by a first ultrasonic emitter, ultrasonic waves into a first testing volume containing water;

detecting, by a first ultrasonic sensor, a sonic response of bacteria in the first testing volume to the emitted ultrasonic waves;

determining, by a processor, an amount of bacteria in the water based on the detected sonic response;

emitting, by a second ultrasonic emitter, ultrasonic waves into a second testing volume containing water;

detecting, by a second ultrasonic sensor, a sonic response of bacteria in the second testing volume to the emitted ultrasonic waves;

comparing, by the processor, the sonic response in the second testing volume to the sonic response in the first testing volume; and determining, by the processor, based on the comparison of the sonic response in the second testing volume to the sonic response in the first testing volume, whether to initiate one or more responsive operations.

* * * * *